(12) United States Patent
Kim et al.

(10) Patent No.: US 9,745,442 B2
(45) Date of Patent: Aug. 29, 2017

(54) EPOXY RESIN COMPOSITION FOR NEUTRON SHIELDING, AND METHOD FOR PREPARING THE SAME

(75) Inventors: Jae-Woo Kim, Daejon (KR); Ji-Heon Jun, Seoul (KR); Yeon-Joo Bae, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 710 days.

(21) Appl. No.: 14/117,048

(22) PCT Filed: May 11, 2012

(86) PCT No.: PCT/KR2012/003721
§ 371 (c)(1),
(2), (4) Date: Nov. 12, 2013

(87) PCT Pub. No.: WO2012/157903
PCT Pub. Date: Nov. 22, 2012

(65) Prior Publication Data
US 2014/0312536 A1 Oct. 23, 2014

(30) Foreign Application Priority Data
May 13, 2011 (KR) ........................ 10-2011-0045085

(51) Int. Cl.
*C08K 3/22* (2006.01)
*C08G 59/50* (2006.01)
(Continued)

(52) U.S. Cl.
CPC ............... *C08K 3/22* (2013.01); *B29C 35/02* (2013.01); *C08G 59/50* (2013.01); *C08J 3/242* (2013.01);
(Continued)

(58) Field of Classification Search
None
See application file for complete search history.

(56) References Cited

U.S. PATENT DOCUMENTS 6,287,992 B1 9/2001 Polansky et al.
2003/0024170 A1* 2/2003 Larson ................ B24D 11/001
51/298
(Continued)

FOREIGN PATENT DOCUMENTS

CN 100446134 C 12/2008
JP S60-194394 A 10/1985
(Continued)

OTHER PUBLICATIONS

Ivanov et al.; "Effect of Processing on Rheological Properties and Structure Development of EPOXY/MWCNT Nanocomposites"; J. Nanopart Res.; Feb. 8, 2011; 11 pages; DOI 10.1007/s11051-011-0259-5; Springer.
(Continued)

*Primary Examiner* — Stella Yi
(74) *Attorney, Agent, or Firm* — The Webb Law Firm

(57) ABSTRACT

Provided is an epoxy resin composition including a nano-sized radioactive radiation shielding material which has superior shielding effects for against radiation, and to a method for preparing same. In particular, the method for preparing the epoxy resin composition for neutron shielding, includes the steps of: a step of mixing a boron compound powder for absorbing neutrons, optionally a high density metal powder for shielding from against gamma rays and a flame retardant powder, respectively separately or in combination, with an amine-based curing agent to obtain a mixture of a curing agent and a powder; an ultrasonic wave treating step of applying ultrasonic waves to the mixture to coat the surface of the powder with the amine-based curing agent and to disperse the powder in the curing agent; and a
(Continued)

dispersing step of mixing and dispersing the amine-based curing agent, that was dispersed and includes the powder treated with ultrasonic waves, in an epoxy resin.

8 Claims, 11 Drawing Sheets

(51) Int. Cl.
  *C08L 63/00* (2006.01)
  *C08K 3/38* (2006.01)
  *B29C 35/02* (2006.01)
  *C08J 3/24* (2006.01)
  *C08K 9/04* (2006.01)
  *C08K 3/08* (2006.01)

(52) U.S. Cl.
  CPC ............... *C08K 3/38* (2013.01); *C08K 9/04* (2013.01); *C08L 63/00* (2013.01); *C08J 2363/00* (2013.01); *C08K 3/08* (2013.01); *C08K 2003/2224* (2013.01); *C08K 2003/2227* (2013.01); *C08K 2003/2234* (2013.01)

(56) References Cited

U.S. PATENT DOCUMENTS

| | | |
|---|---|---|
| 2003/0102445 A1 | 6/2003 | Kamoshida et al. |
| 2007/0269653 A1* | 11/2007 | Kanamori ............ B01J 31/069 428/336 |
| 2008/0039566 A1 | 2/2008 | Hayashi et al. |
| 2010/0102279 A1 | 4/2010 | Kim et al. |

FOREIGN PATENT DOCUMENTS

| | | |
|---|---|---|
| JP | 04042869 A | 2/1992 |
| JP | 2002-512286 A | 4/2002 |
| JP | 2003167091 A | 6/2003 |
| JP | 2003-255081 | 9/2003 |
| JP | 2007-132893 | 5/2007 |
| JP | 2010-038615 | 2/2010 |
| JP | 2010-230411 | 10/2010 |
| JP | 2011007510 A | 1/2011 |
| KR | 1020060128996 A | 12/2006 |
| KR | 1020070050709 A | 5/2007 |
| KR | 100909106 B1 | 7/2009 |
| KR | 1020100047510 A | 5/2010 |
| KR | 1020100111454 A | 10/2010 |
| WO | 2007055498 A1 | 5/2007 |

OTHER PUBLICATIONS

Chatterjee et al.; "Fabrication and Characterization of TiO2—epoxy Nanocomposite"; Materials Science and Engineering A; 2008; pp. 574-585; vol. 487.

* cited by examiner

EPOXY RESIN COMPOSITION FOR NEUTRON SHIELDING, AND METHOD FOR PREPARING THE SAME

TECHNICAL FIELD

Aspects of embodiments relate to a nanoscale epoxy resin composition for neutron shielding, suitable for a spent nuclear fuel transportation cask, including nanoscale neutron absorbing and high density metal, and flame retardant materials, and having excellent neutron shielding capabilities, and a method of producing the same.

BACKGROUND ART

With recent developments in the nuclear power industry, stable operation of the nuclear power plants has become more important than ever before. Among several factors involved in improving safety in the nuclear power plants, stable and effective management of spent nuclear fuel is extremely important. Since the nuclear fuels (enriched uranium) used in a nuclear power plant should be periodically replaced with new nuclear fuels when the use period expires, the spent nuclear fuel should be also periodically discharged. Since such spent nuclear fuels emit radiation, shielding for radiation emitted from a spent nuclear fuel transportation cask is critical for human beings as well as the environments.

Throughout the world, spent nuclear fuel can be stored by using two methods, which are the dry and wet storage methods. For example in Korea, spent nuclear fuels are temporarily stored in storage sites in nuclear power plants using both the wet method and the dry method. In order to store spent nuclear fuel in storage sites for a predetermined period of time, or store spent nuclear fuel in intermediate storage facilities, permanent processing facilities, re-processing facilities or the like, the spent nuclear fuel needs to be transported using a transportation cask. In this case, transportation casks for such spent nuclear fuel need to have a neutron shielding material provided therein. As such a neutron shielding material, in general, a shielding material having relatively high hydrogen content, such as an epoxy, a high-density polyethylene, polystyrene, water, ethylene glycol or the like, may be used.

The radiation shielding material should be able to allow for the amount of radiation emitted from spent nuclear fuel transportation casks to be significantly reduced for the safety of humans and to prevent structural materials or equipment components from being damaged or contaminated. In particular, since neutrons generated from spent nuclear fuel have high energy and high penetrating powder, the research for development of an efficient neutron shielding material capable of stably and definitively shielding high energy neutrons is making progress.

The neutrons as described above are classified as fast and thermal neutrons, depending on the amount of energy thereof. When a fast neutron collides with a light element such as hydrogen, it loses energy (speed), and thus becomes a slow neutron, and slow neutrons as above are finally absorbed by a material having a large slow neutron absorption cross sectional area, such as boron, lithium and gadolinium, provided in the neutron shields in the spent nuclear fuel transportation casks.

Therefore, as a fast neutron shielding material, a material obtained by mixing a shielding material should be able to absorb a thermal neutron in a polymer compound having a high hydrogen concentration, that is, a polyolefin-based thermoplastic resin such as ethylene glycol, polyethylene, or the like, a thermosetting resin such as an unsaturated polyester resin or the like, or a resin such as an epoxy resin or the like, may be used.

Meanwhile, primary and secondary gamma rays are generated by the spent nuclear fuels as described above. Secondary gamma rays may be shielded by a mixture of a high density metal powder, and the high density metal powder is added to a mixture thereof, such that a shielding material density is generally 1.6 g/cm$^3$ or more.

In addition, the development of a neutron shielding material is able to maintain neutron shielding capabilities, even in a case in which a fire breaks out has progressed. In this connection, as a flame retardant, a neutron shielding material including an aluminum hydroxide powder, a magnesium hydroxide powder or the like, mixed therewith, has been proposed.

As described above, as the added neutron absorbing particles, a neutron shielding powder having an average powder particle size of 10 to 200 μm, in consideration of dispersion properties in a polymer resin, a matrix, and shielding properties against neutrons has been used. However, since the size of such a neutron shielding material, a high density metal powder or a flame retardant particle is relatively large, on the level of micrometers or more, there are the possibilities of the occurrence of radiation leak or the particles as described above acting as impurities, thus acting as a factor deteriorating physical properties of a composite material.

It is therefore necessary to increase the possibility of collisions between radiation and a neutron shielding material having neutron absorber and high density metal particles, and to this end, a method of increasing radiation shielding efficiency by miniaturizing particles to be used may be considered.

However, in a case in which a nanoscale radiation shielding material is used, although advantages in that a radiation shielding function and physical properties of a composite material are improved and the like, are provided, since such a nanoscale shielding material has high degree of surface energy to increase viscosity of a polymer, it may be difficult to perform roll mixing milling in a matrix resin, and since nanoscale particles are in an unstable state and thus have a nature in which particles are agglomerated with each other, it may be difficult to allow nanoscale particles to be uniformly dispersed in a polymer resin.

In general, in a case in which nanoscale powder particles are dispersed in a polymer resin, it may be important to prevent powder particles from being agglomerated and also improve adhesion between the fine particles and the resin, and to this end, a method in which a particle surface is chemically treated by using a surfactant may generally be used.

However, performance of a chemical surface treatment using a surfactant may be complicated, a surfactant itself may act as a foreign object, and process costs may be unfeasible due to high costs incurred in producing a polymer (epoxy) composite material.

The present inventors found that a particle size of the radiation shielding particles in a shielding body has a significant influence on radiation shielding capabilities, and in detail, when the nanoscale radiation shielding particles are included in a shielding body, the possibility that incident radiation will collide with the nanoscale radiation shielding particles increases, so thereby improve radiation shielding effects, and on this basis, filed an application for a patent (Korean Patent Laid-Open Publication No. 2010-0047510, this patent was divided, one is registered and the other went to the court) related to a radiation shielding material for allowing for nanoscale radiation shielding particles to be uniformly dispersed in a polymer base or the like. The patent document described above also discloses a technology for physically surface-processing nanoscale particles with a surfactant having high affinity with a polymer resin to melt into and be mixed with the polymer resin during a process of producing nanoscale particles through a ball milling process in order to obtain uniform dispersion of nanoscale particles.

SUMMARY OF THE INVENTION

An aspect of an embodiment provides an epoxy resin composition having an excellent neutron shielding function, and a method of manufacturing an epoxy resin composition by physically coating a surface of a nanoscale neutron absorbing particles and gamma ray shielding high density metal powder particles using a simplified method so as to allow the nanoscale neutron absorbing particles and the gamma ray shielding high density metal powder particles to be uniformly dispersed in an epoxy resin, simultaneously with enhancing radiation shielding capabilities of a composite material by improving interface adhesion of a nanoscale powder particles with a polymer resin so as to significantly improve physical mechanical properties. Further, an epoxy resin composition obtained by the method is provided.

An aspect of an embodiment provides a method of manufacturing an epoxy resin composition for neutron shielding, including: obtaining a mixture of a curing agent and a powder by mixing an amine-based curing agent with either a boron compound powder for neutron absorption or a powder selectively containing a gamma ray shielding, high density and flame retardant powder or with a mixture thereof; performing an ultrasonic wave treatment by applying ultrasonic waves to the respective mixture to coat the powder surface with the amine-based curing agent, simultaneously with allowing powder particles to be dispersed in the curing agent; and mixing the amine-based curing agent including the ultrasonic wave-treated and dispersed powder particles with an epoxy resin to then be dispersed.

The boron compound powder may be at least one selected from a group consisting of $B_4C$, BN, $B_2O_3$ and $B(OH)_3$, the high density metal powder may be at least one selected from a group consisting of Fe, Ni, Cu, W, Pb and oxides thereof, and the flame retardant powder may be at least one selected from a group consisting of aluminum hydroxide and magnesium hydroxide.

The boron compound powder and the high density metal powder may have a grain size of 200 nm to 1000 nm.

The flame retardant agent may have a grain size of 200 nm to 10 μm.

The ultrasonic waves may be applied by directly immersing an ultrasonic horn in the mixture including the amine-based curing agent, the boron compound, the high-density metal powder and the flame retardant powder respectively mixed therein.

An aspect of an embodiment provides a method of manufacturing a neutron shielding material, including forming an epoxy resin composition produced as described above to have a predetermined form and then drying and curing the formed epoxy resin composition.

An aspect of an embodiment provides an epoxy resin composition for radiation shielding, including: an amine curing agent of 40 to 60 parts by weight with regard to 100 parts by weight of an epoxy resin; and a boron compound powder for neutron absorption, having a grain size of 200 nm to 1000 nm and surface-processed with the amine curing agent, in an amount of 1 to 10 wt % to a total weight of the epoxy resin composition, a gamma ray shielding high density metal powder selectively having a grain size of 200 nm to 1000 nm and surface-processed with the amine curing agent, in an amount of 1 to 30 wt % to the total weight of the epoxy resin composition, and an aluminum hydroxide powder, a magnesium hydroxide powder or a mixture thereof, selectively having a grain size of 200 nm to 10 μm, in an amount of 10 to 30 wt % to the total weight of the epoxy resin composition.

The boron compound powder may be at least one selected from a group consisting of $B_4C$, BN, $B_2O_3$ and $B(OH)_3$, and the high density metal powder may be at least one selected from a group consisting of Fe, Ni, Cu, W, Pb and oxides thereof.

The aluminum hydroxide powder or the magnesium hydroxide powder may be surface processed with the amine curing agent.

By using a direct ultrasonic wave dispersion method according to an embodiment of the inventive concept, nanoscale powder particles may be uniformly and effectively dispersed in an epoxy matrix, and strong bonding between an epoxy matrix and the powder particles may be promoted, such that excellent radiation shielding of radiation such as neutrons and gamma rays may be obtained using a nanoscale powder without using any further chemical processing and impurities, and in addition, chemical and physical characteristics of a shielding material may be improved.

The radiation shielding material according to the embodiment of the inventive concept may ensure a material added to absorb a neutron and to attenuate gamma rays, to be on the nano scale, such that a basically thinner and lighter shielding material may be obtained, and adhesion at an interface between a resin matrix and particles may be improved, thereby achieving excellent physical and/or chemical properties in a shielding material. Therefore, the radiation shielding material according to the embodiment may be effectively utilized to manufacture an epoxy-based neutron shielding material suitable for a spent nuclear fuel transportation cast.

DESCRIPTION OF DRAWINGS

The above and other aspects, features and other advantages will be more clearly understood from the following detailed description taken in conjunction with the accompanying drawings, in which:

FIGS. 3A to 3D are SEM images illustrating fracture surfaces of 5 wt % of $B_4C$/epoxy composite materials produced under various conditions, in which FIG. 3A illustrates an SEM image of raw-$B_4C$ without any processing or surface processing, FIG. 3B illustrates an SEM image of epoxy-coated $B_4C$ without direct ultrasonic processing (corresponding to FIG. 2B), FIG. 3C illustrates an SEM image of raw $B_4C$ being directly ultrasonic surface processed and dispersed, and FIG. 3D illustrates an SEM image of epoxy-coated $B_4C$ being directly ultrasonic surface processed and dispersed;

BEST MODE FOR INVENTION

Figure 1:
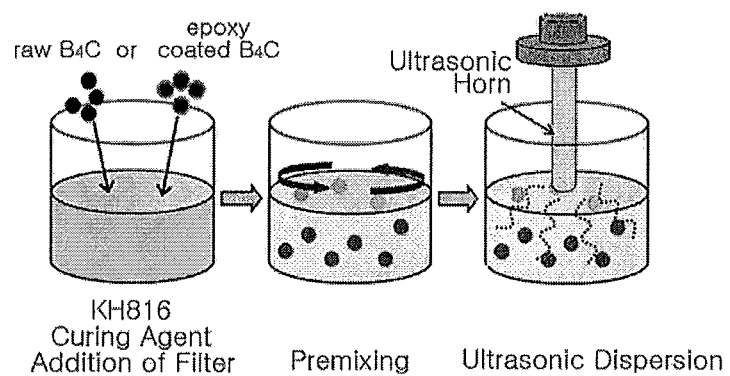
FIG. 1 is a diagram schematically illustrating a process in which $B_4C$ nano-particles are dispersed in a curing agent using a direct ultrasonic wave dispersion method according to an embodiment.

Hereinafter, embodiments will be described in detail with reference to the accompanying drawings. Embodiments may, however, be embodied in many different forms and should not be construed as being limited to embodiments set forth herein. Rather, these embodiments are provided so that this disclosure will be thorough and complete, and will fully convey the scope of the inventive concept to those skilled in the art. In the drawings, the shapes and dimensions of elements may be exaggerated for clarity.

According to an embodiment of the inventive concept, a method of coating-treating a nanoscale powder surface and an epoxy resin composition obtained using the method and having a neutron shielding function may be provided. In the method of coating-treating a nanoscale powder surface, a surface of a boron compound powder for neutron absorption and a high density metal powder for gamma ray shielding may be coating treated such that a phenomenon in which nanoscale powder particles are agglomerated may be prevented so as to allow nanoscale powder particles to be uniformly dispersed in a polymer matrix and increase adhesion at an interface between the nanoscale powder particles and the polymer. To this end, an ultrasonic horn may be immersed in a curing agent mixed with nanoscale powder particles to be dispersed such that the nanoscale powder and the curing agent may be directly activated.

The resin composition for neutron shielding according to the embodiment may include a curing agent neutron absorption powder and a high density metal powder for gamma ray attenuation in an epoxy resin matrix provided as a main material. Further, the resin composition may include a flame retardant mixed therewith to thereby impart fire retardant properties thereto.

The epoxy resin used as the main material may refer to a resin including a linkable epoxy group. As the epoxy resin used in the embodiment, any resin may be used as long as it is a generally used resin, without particular limitations. In detail, for example, a glycidyl ether/2-functional phenol-type epoxy resin, a glycidyl ether/multifunctional phenol-type epoxy resin, a glycidyl ether/alcohol-type epoxy resin, a glycidyl ester-type epoxy resin, an aliphatic epoxy resin, an alicyclic epoxy resin, a modified epoxy resin, or the like, may be used. In addition, a hydrogenated epoxy resin in which hydrogen is added to a ring structure of an epoxy resin may be mixed and used. As the epoxy resin described above, one type of epoxy resin or two or more types of epoxy resin may be mixed and used.

The resin composition for neutron shielding may react with an epoxy resin to form a cross-linking structure and may be an amine-based curing agent, an acid and acid anhydride-based curing agent, a phenol-based curing agent, or the like, and for example, an amine-based curing agent may be used. In addition, in the case of the amine-based curing agents, a curing agent having a ring structure, such as an alicyclic amine-based curing agent, an aromatic amine-based curing agent, or the like, may have relatively high heat resistance, and thus, may be used for a composition according to an embodiment of the inventive concept. As the curing agent, one type of curing agent may be used, or two or more types of curing agent may be mixed and used.

The curing agent may be variable depending on a curing agent type, a different ingredient type or content or the like, but for example, in the case of an amine-based curing agent, 40 to 60 parts by weight of an amine-based curing agent to 100 parts by weight of the epoxy resin may be included. When the content of the amine-based curing agent is less than 40 parts by weight to 100 parts by weight of the epoxy resin, a curing agent effect may be relatively low, and when the content of the amine-based curing agent to 100 parts by weight of the epoxy resin exceeds 60 parts by weight, the curing may progress too fast, such that it may be difficult to secure working time necessary for charging or the like.

On the other hand, the resin composition for neutron shielding according to an embodiment may include a neutron absorbing boron compound powder and a gamma ray attenuating high density metal powder. The boron compound as described above may be mixed in a small amount so as to act as a neutron absorbing material, and is widely used in the field as a neutron absorbing material. As such, any material may be used as long as it is a publicly known material having a neutron absorption function, without particular limitations.

For example, as a boron compound having a neutron absorbing function, a boron compound having a large slow-neutron absorption cross sectional area, such as boron nitride, an anhydrous boric acid, boron iron, an orthoboric acid, boron carbide, a metabolic acid, or the like, may be used, but is not limited thereto. The boron compound described above may be one type of boron compound and two types of boron compounds mixed with each other. For example, boron carbide ($B_4C$), not affected by a temperature and not absorbing moisture, that is, having relatively high chemical stability and not having a high influence on a neutron shielding material in which a polymer is used as a main material therein, may be used.

The boron compound may be used as a powder, and a grain size and an added amount thereof may be appropriately adjusted. The added amount of the boron compound may be variable depending on a boron compound type used, a different ingredient type or content, and the like, and for example, the added amount thereof may be within a range of 1 to 10 wt % with respect to the total weight of the epoxy resin composition. When the content of the boron compound is less than 1 wt %, an effect of a neutron absorbing function by the added boron compound is relatively low, and when the content of the boron compound exceeds 10 wt %, a hydrogen concentration of polymer resin may be decreased. Further, physical properties of a shielding material may be deteriorated.

In addition, a resin composition for neutron absorption according to an embodiment may include a high density metal powder for attenuating gamma rays by an increase in a shielding material. As the high density metal for attenuating gamma rays, for example, Fe, Ni, Cu, W, and Pb, and an oxide thereof may be provided, but is not limited thereto. The high density metal powder may be used with one type of powder or two or more types of powder particles mixed with each other. For example, lead oxide (PbO), having a relatively high degree of chemical stability, low costs and not having a high influence on a neutron shielding material in which a polymer is used as a main material therein, may be used.

The high density metal material may be a metal powder, and a grain size and an added amount thereof may be appropriately adjusted. Although the added amount of the high density metal powder may be variable depending on a powder type used, a different ingredient type or content, and the like, for example, the added amount thereof may range from 1 to 30 wt % with respect to the total weight of the epoxy resin composition. When the added amount of the high density metal powder is less than 1 wt %, an effect of an increase in a shielding material density may be relatively low, and when the added amount of the high density metal powder is more than 30 wt %, a hydrogen concentration of a polymer resin may be decreased, and physical properties may be deteriorated.

Meanwhile, in connection with the neutron absorbing boron compound or the gamma ray attenuating high density metal powder particle, according to the related art, an average particle size of powder particles is on the micro scale in the range of approximately 10 to 200 µm in consideration of dispersing properties in a resin and radiation shielding properties. That is, the size of powder particles may be reduced in terms of radiation shielding properties, but due to limitations in the dispersion properties in the epoxy resin, there may be limitations in using further reduced, nanoscale powder particles.

However, according to an embodiment of the inventive concept, even when a nanoscale powder for neutron absorption and gamma ray attenuation, having an average particle size on the nanometer scale, is used, uniform dispersion properties thereof in the epoxy resin may be secured using a method according to an embodiment to be described below, such that the neutron absorbing boron compound and the gamma ray attenuating high density metal may be applied using a nanometer scale powder. Further, when the nanometer scale powder particles are uniformly dispersed as described above, a radiation shielding function of a shielding material and mechanical characteristics thereof may be increased.

In order to uniformly disperse nanoscaled boron compound particles for neutron absorption and a nanoscaled high density metal powder particles for gamma ray attenuation, an ultrasonic horn may be used according to an embodiment. More in detail, as schematically illustrated in FIG. 1, uniform dispersion of powder particles may be simply obtained by mixing a nanosize powder with a curing agent for an epoxy resin, that is, a matrix resin, and directly applying ultrasonic waves to the obtained mixture using the ultrasonic horn. The ultrasonic processing may be performed to process the nanosize boron compound particles and high density metal powder particles simultaneously with each other or separately from each other. As such, an ultrasonic horn may be immersed in the mixture of the nanosize powder and the curing agent such that ultrasonic waves are directly applied thereto, thereby allowing the surface of nanoscale powder particles to be coated with a curing agent and thus allowing nanoscale powder particles to be uniformly dispersed in the curing agent.

Although it is not fully understood in which excitation by the direct ultrasonic wave reinforces dispersion of nanoscale powder particles within the epoxy matrix and bonding between the epoxy matrix and the nanoscale powder particles may be provided, it is estimated that powerful ultrasonic energy may generate microbubble destruction on nanoscale powder particle surfaces to thus cause a abrupt change in density, and during the change in density on the nanoscale powder particle surfaces, wetting properties of particles between the curing agent and the nanoscale powder particles in the epoxy matrix may be improved by strong VanderWaals force.

The epoxy composite material may be produced by using an epoxy resin composition including the epoxy resin, the curing agent and the neutron absorbing boron compound coated with a curing agent, and the gamma ray attenuating high density metal powder as described above, thereby obtaining a neutron shielding material having an excellent neutron shielding function.

In addition, the neutron shielding resin composition according to the embodiment as described above may also selectively include a flame retardant such as aluminum hydroxide, magnesium hydroxide, or the like. The flame retardant as described above may be added to allow a neutron shielding material to remain such that a neutron shielding function may be maintained when the neutron shielding material is exposed to a high temperature, for example, in a case in which a fire breaks out. The flame retardant may be used alone or two or more types of flame retardants may also be used.

In general, the flame retardant of magnesium hydroxide and aluminum hydroxide described above may be in a powder form, and in general, a grain size of the flame retardant powder is not particularly limited, and for example, may have an average particle size of 10 µm or less. Similar to the powder for neutron absorption and secondary gamma ray attenuation as described above, when a grain size is further reduced, since further improved flame retardant characteristics and physical mechanical properties of a shielding material may be obtained, the flame retardant powder having an average particle size of 10 µm or less may be used, or in detail, the flame retardant powder having an average particle size on the nano scale may be used.

In the same manner as the boron compound powder and the high density metal powder, the flame retardant powder particles as described above may also be coated with a curing agent by performing direct ultrasonic processing thereon such that a uniform dispersion effect of powder particles in the curing agent may be promoted.

The flame retardant dosage may be variable depending on a used flame retardant, a different ingredient type, the content thereof and the like, and is not particularly limited, but may be added in an amount ranging from 10 to 30 wt % with regard to the total weight of the epoxy resin composition. When the content of the flame retardant to the total weight of the epoxy resin composition is less than 10 wt %, a flame retardant effect obtainable by using the flame retardant may be relatively low, and when the content of the flame retardant to the total weight of the epoxy resin composition is more than 30 wt %, a hydrogen concentration in which a polymer is used as a main material is relatively decreased, and thus, the possibility that fast neutron attenuating capability is deteriorated may occur.

By the direct ultrasonic processing according to an embodiment, a neutron absorbing powder and a high density metal powder may be coated with a curing agent and uniformly dispersed in the curing agent, and a mixture thereof may be mixed with an epoxy resin used as a matrix to thereby obtain a resin composition. When a neutron shielding material is produced using the resin composition obtained as described above, an improvement effect in physical and mechanical properties of the obtained neutron shielding material may be obtained.

Hereinafter, the inventive concept will be described in more detail based on the following embodiments. However, the embodiments are only for illustration of the inventive concept, and should not be construed as being limited thereto.

EMBODIMENTS

Embodiment 1

An epoxy resin composition was produced by preparing 60 parts by weight of a hydrogenated epoxy resin (ST3000 by Kukdo Chemical Co., Ltd.) and 40 parts by weight of a bisphenol B-type epoxy resin (YD127 by Kukdo Chemical Co., Ltd.) and adding 55 parts by weight of an amine curing agent as a curing agent (KH-816 by Kukdo Chemical Co., Ltd.) and a $B_4C$ powder having an average particle size of 500 nm (Kojundo Chem., Japan), in the content of 5 wt %, with respect to a total weight including the epoxy resin, the amine curing agent and the $B_4C$ powder.

First, the $B_4C$ powder was used two types of powder particles as described below.

i) $B_4C$ powder particles without any surface processing performed thereon.

ii) $B_4C$ powder and the epoxy resin were mixed at a weight ratio of 10:1, and 0.35 weight by weight of a mixture thereof with respect to a weight of acetone stored in a beaker was added to the beaker having the acetone contained therein to then be subjected to roll mixing milling. The beaker was immersed in an ultrasonic bath for 30 minutes and then introduced into a dry oven to evaporate the acetone. Whereby, an epoxy-coated $B_4C$ powder was prepared by coating the $B_4C$ powder with the epoxy resin.

Figure 2A:
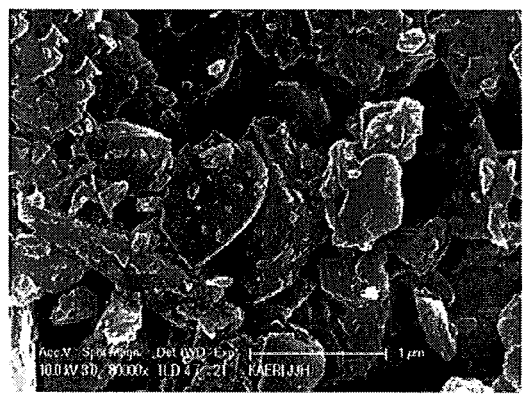
FIGS. 2A and 2B are scanning electron microscope (SEM) photographs illustrating surface morphology of $B_4C$ particles 2A before and 2B after an epoxy surface treatment is performed within an ultrasonic wave cask.
Figure 2B:
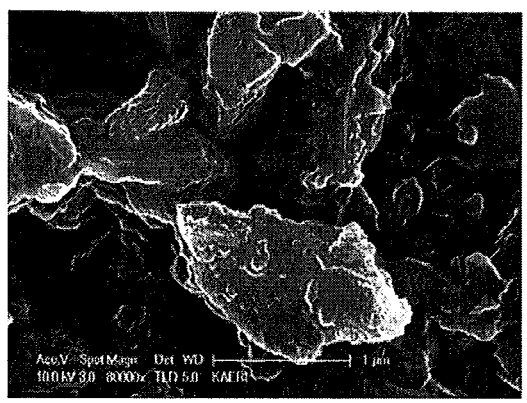

Images of the obtained respective $B_4C$ powder particles were captured using a field emission scanning electron microscope (FE-SEM), and the images are illustrated in FIG. 2. FIG. 2A illustrates an FE-SEM image of the $B_4C$ powder without surface processing in i) above, and FIG. 2B illustrates an FE-SEM image of the $B_4C$ powder coated with the epoxy resin in ii) above.

As can be seen from FIG. 2B, it can be appreciated that the epoxy-coated $B_4C$ powder particle had surface morphology differentiated from that of the $B_4C$ powder particle without surface processing in FIG. 2A. Therefore, it was determined as including an epoxy coating layer formed on the $B_4C$ powder particle surface.

$B_4C$/epoxy composite materials were produced using the $B_4C$ powder as described above through the following methods, respectively.

An epoxy resin having a high hydrogen concentration was produced by premixing a hydrogenated epoxy resin (ST3000) and a bisphenol A-type epoxy resin (YD127 by Kukdo Chemical Co., Ltd.).

Then, curing agent-$B_4C$ mixtures were prepared by mixing the $B_4C$ powder particles of i) and ii) above with the curing agent KH-816, and a composition 1 and a composition 2 were produced by mixing the mixtures with the prepared epoxy resin.

On the other hand, the $B_4C$ powder particles of i) and ii) above were mixed with the amine curing agent as illustrated in FIG. 1 and then mechanically stirred for 5 minutes, and an ultrasonic horn (JUW-2014 by JANO Sonic Ltd., Korea) was immersed in the mixture described above to be subjected to ultrasonic processing for 20 minutes so as to be excited, whereby a mixture of $B_4C$-curing agent surface-processed with an amine curing agent was obtained. In this case, a frequency of ultrasonic wave was 20 kHz and electric powder thereof was around 50 W. Subsequently, the mixture of $B_4C$-curing agent surface-processed with the amine curing agent was mixed with the prepared epoxy resin and composition 3 and composition 4 were thus produced.

Compositions 1 to 4 obtained as above were respectively stirred in an epoxy mixer for 15 minutes, respectively, using a rotary blade. A rotation speed of the blade was maintained at 65 to 70 rpm and a mixing chamber was vacuum pumped during the mixing process such that an air bubbles inside the resin became significantly reduced. After the mechanical mixing as described above, the epoxy mixture was poured into a silicon mold and cured in a dry oven of 50° C. for 20 hours, whereby four types of $B_4C$/epoxy composite materials were respectively produced.

In order to evaluate a surface state of $B_4C$ particles present in the $B_4C$/epoxy composite material, surface images of the obtained four types of $B_4C$/epoxy composite materials were captured using an SEM and the images are illustrated in FIG. 3. In FIG. 3, FIG. 3A is a SEM image illustrating a fracture surface of a composite material obtained from composition 1 using raw-$B_4C$ without any processing, FIG. 3B is a SEM image illustrating a fracture surface of a composite material obtained from composition 2 using epoxy-coated $B_4C$, FIG. 3C is a SEM image illustrating a fracture surface of a composite material obtained from composition 3 using $B_4C$ obtained by performing direct ultrasonic processing on raw-$B_4C$, and FIG. 3D is a SEM image illustrating a fracture surface of a composite material obtained from composition 4 using $B_4C$ obtained by performing immersion ultrasonic processing on epoxy-coated $B_4C$.

Figure 3A:
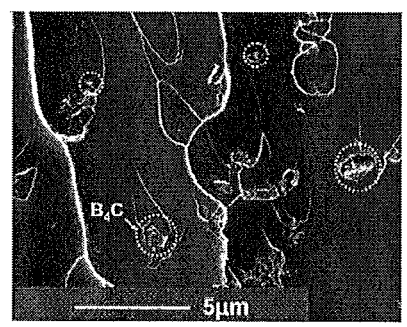

In the case of FIG. 3A, the dispersion of $B_4C$ particles was shown as being relatively proper therefor, but a gap between a particle surface represented as a circle and a matrix in the image was observed. The presence of such a gap indicates relatively low bonding force between the matrix and particles.

Figure 3B:
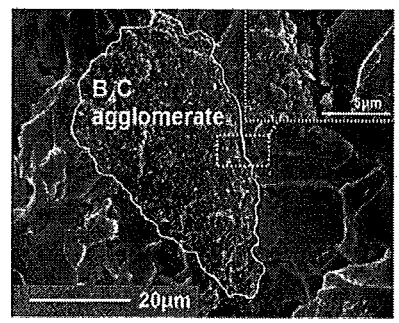

Meanwhile, as can be seen from FIG. 3B, agglomeration of the $B_4C$ particles was observed on the surface thereof, and further, as shown in an enlarged view inserted in FIG. 3B, it can be appreciated that a gap was found in a boundary portion of particles. It can be estimated from the results as above that even when $B_4C$ coated with epoxy is used; bonding force between a $B_4C$ aggregate and an epoxy matrix would be relatively low.

It can be estimated from the images of FIGS. 3A and 3B that the epoxy coating on $B_4C$ particles does not improve the dispersion in the epoxy matrix and the bonding with the epoxy matrix (FIG. 3B), while raw $B_4C$ may provide good dispersion properties although the bonding force between the epoxy matrix and the particles is somewhat low (FIG. 3A).

Figure 3C:
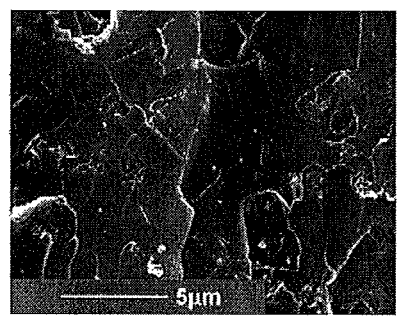
Figure 3D:
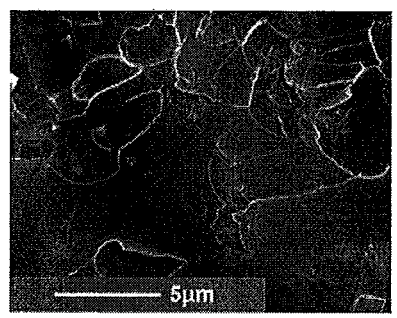

On the other hand, as can be seen from FIGS. 3C and 3D illustrating the images of composites obtained using compositions 3 and 4, only a small amount of $B_4C$ particles were observed on fracture surfaces of the composite. When the bonding between a polymer matrix and a filler particle is relatively strong, a fracture surface is developed along the matrix itself other than along an interface between a particle and a polymer. Therefore, the observation of the small amount of $B_4C$ particles shown in the SEM images of FIGS. 3C and 3D may be a strong evidence of good bonding between the epoxy matrix and $B_4C$ particles. That is, it can be appreciated that when direct ultrasonic processing was performed so as to provide excitation using a horn, the bonding force between the epoxy matrix and the $B_4C$ particles was stronger in the cases of FIGS. 3C and 3D as compared to the cases of FIGS. 3A and 3B.

In addition, the excitation through the direction ultrasonic processing in the cases of FIGS. 3C and 3D did not generate agglomeration between particles, and thus, it is determined that $B_4C$ particles may be effectively dispersed.

A mechanism in which the excitation through direct ultrasonic processing reinforces the dispersion of $B_4C$ particles in the epoxy matrix and the bonding between the epoxy matrix and the $B_4C$ particles may not be definitely understood. Although it is not theoretically limited, it is estimated that powerful ultrasonic energy induces microbubble destruction generated by a curing agent molecules on $B_4C$ particle surfaces to cause a variation in a density on the $B_4C$ surfaces, and during the variation in density on the $B_4C$ particle surfaces, strong VanderWaals force occurs between a ring substituent of an amine curing agent molecule and $B_4C$ such that wetting properties of particles may be improved in the epoxy matrix.

Figure 4:
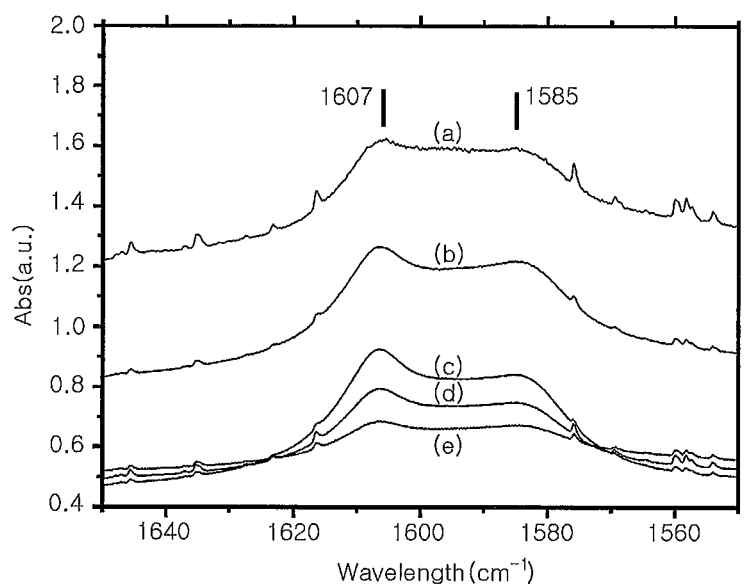
FIG. 4 illustrates FTIR spectra of an amine curing agent including $B_4C$ particles dispersed therein under various conditions, in which (a) refers to a spectrum of a direct ultrasonic surface-processed and dispersed $B_4C$/curing mixture, (b) refers to a spectrum of an untreated $B_4C$/curing agent mixture not being direct ultrasonically processed, (c) refers to a spectrum of a pure curing agent, (d) refers to a spectrum of an epoxy-coated $B_4C$/curing agent compound without direct ultrasonic processing, and (e) refers to a spectrum of an epoxy-coated $B_4C$/curing mixture without direct ultrasonic processing.

In addition, in order to evaluate a surface state of the $B_4C$ particle, the analysis on a FTIR spectrum of the $B_4C$/curing agent mixture is illustrated in FIG. 4. In FIG. 4, (a) provides an analysis of an FTIR spectrum of the raw $B_4C$/curing agent dispersed by the ultrasonic processing obtained in iii), (b) provides an FTIR spectrum of the raw $B_4C$/curing agent of i) not being ultrasonically dispersed, (c) provides an FTIR spectrum of a pure curing agent, (d) provides an FTIR spectrum of the epoxy-coated $B_4C$/curing agent of ii) not being ultrasonically dispersed, and (e) provides an FTIR spectrum of the epoxy-coated $B_4C$/curing agent of iv) being ultrasonically dispersed.

The FTIR spectrum described above was obtained using a thin liquid phase film of a $B_4C$ dispersed curing agent, disposed within KRS-5 window. FIG. 4 indicates aromatic C=C vibrations including a stretching vibration mode of carbon and carbon within a curing agent ring in 1607 $cm^{-1}$, and a second peak positioned in 1585 $cm^{-1}$ results from a ring substituent. Absorption peak irradiation of a ceramic powder dispersed polymer composite may be useful for evaluating particle bonding, which may be based on a characteristic that a vibration absorption peak of a polymer molecule may be significantly affected by VanderWaals interaction.

In FIG. 4, (b) and (d) respectively refer to the same two stretching peaks at respective locations, similarly to the case of (c) corresponding to the pure curing agent. In the case of such spectra, an absorption peak of a curing agent is not affected by $B_4C$ in both cases of (b) and (d), and such a characteristic may indicate that bonding with curing agent molecules on the $B_4C$ surfaces is not strong enough to change the absorption peak of the curing agent. On the other hand, absorption peaks represented in (a) and (e) of FIG. 4 are relatively low and flat since the C=C stretching vibration of a curing agent molecule is affected by relatively strong bonding with a $B_4C$ particle. The flat, low absorption peaks described above may result from a continuously red-shifted stretching kinetic energy spectrum influenced by the ring substituent strongly bonded to $B_4C$ due to the VanderWaals interaction.

Figure 5:
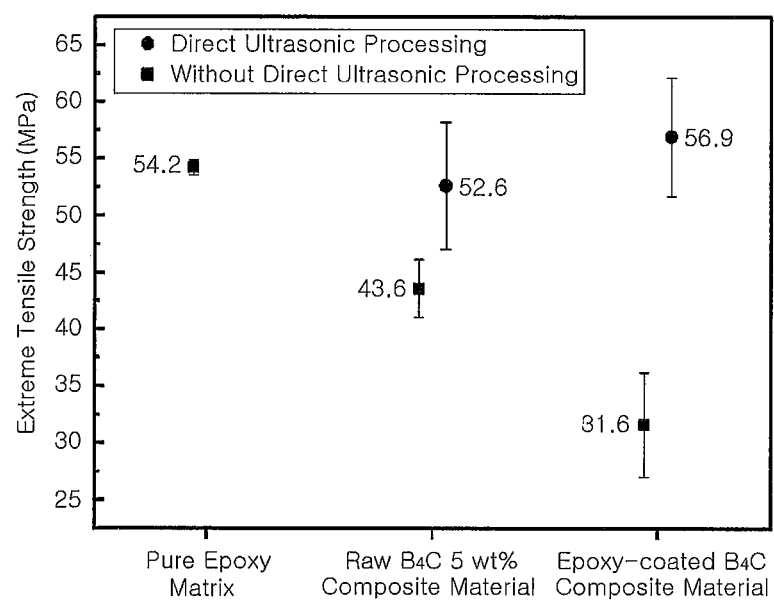
FIG. 5 is a graph illustrating final tensile strength of a pure epoxy matrix and $B_4C$/epoxy composite materials produced under various conditions.

In addition, final tensile strength and the Young's modulus of the $B_4C$/epoxy composite material were analyzed using the standard tensile sample, ASTM D638, using a multipurpose mechanical testing instrument (Instron 3000, USA), and the results thereof are illustrated in FIG. 5. The tension speed was 50 rum/min, and the number of testing samples was five or more, in respective tests. An error bar in the graphs of FIG. 5 refers a standard deviation from five measurements on a respective sample.

FIG. 5 provides final tensile strength of a pure epoxy matrix and $B_4C$-epoxy composite materials produced under various conditions. In general, it is apparent that tensile strength of an epoxy matrix is decreased by the addition of a ceramic filler. On the other hand, when the dispersion of filler particles in the epoxy matrix and the bonding thereof with the epoxy matrix are controlled to be suitable therefor, mechanical characteristics of the epoxy composite material may be reinforced.

With reference to FIG. 5, tensile strength in the epoxy matrix using a pure epoxy resin was 54.1 MPa, but when raw $B_4C$ particles not surface-processed were dispersed in composition (1), the tensile strength of the $B_4C$/epoxy composite material was decreased to 43.6 MPa, and the epoxy-coated $B_4C$/epoxy composite material used in composition (2) was further decreased to 31.6 MPa.

It is estimated that the reduction in the tensile strength as described above is caused by relatively low bonding force at an interface between the epoxy matrix and $B_4C$ represented in FIGS. 3A and 3B. That is, it is because an area or a volume occupied by impurities is identical to a loss of an area or a volume of an epoxy matrix, causing a decrease in strength. In connection with the impurity size, since a size of the epoxy-coated $B_4C$ aggregate present therein is greater than that of non-coated $B_4C$, the tensile strength may be further decreased.

Meanwhile, the tensile strength of the $B_4C$/epoxy composite material obtained from compositions 3 and 4 using raw $B_4C$ and epoxy-coated $B_4C$, dispersed in the curing agent by direct ultrasonic processing using an immersed horn, was improved to 52.6 MPa and 56.9 MPa, respectively. That is, significantly increased tensile characteristics were provided as compared with the case of manufacturing without using direct ultrasonic dispersion. Even when the case in which the tensile strength was increased as above is compared with the case of a pure epoxy matrix, the case in which the tensile strength of the $B_4C$/epoxy composite material obtained from compositions 3 and 4 was increased as described above is competitive or has a numerical value further increased in terms of an error range. Thus, by using the composition obtained through the dispersion by the direct ultrasonic processing, the tensile strength of the composite material may be reinforced and the reinforcement of the tensile strength as described above may be determined as resulting from an improved combination at an interface between $B_4C$ and the matrix as illustrated in FIGS. 3C and 3D.

The tensile strengths of the direct ultrasonic-processed raw $B_4C$/epoxy composite material and the epoxy-coated $B_4C$/epoxy composite material represented similar values, and such characteristics as similar values may indicate that the excitation of $B_4C$ particles by direct ultrasonic waves increases VanderWaals interaction during the ultrasonic excitation regardless of a coated material type.

The increase in the VanderWaals interaction was confirmed by the FTIR spectrum of the $B_4C$/epoxy composite material of FIG. 4. Referring to a change in the peak strength of the curing agent molecule, it could be confirmed to be influenced by $B_4C$ itself ((a) of FIG. 4) or an epoxy on a $B_4C$ surface. In connection with the influence by the epoxy on the $B_4C$ surface, it is regarded that an epoxy molecule bonded to the $B_4C$ surface had an influence on stretching vibration of molecules of the curing agent, as similar to the $B_4C$ itself. The strong VanderWaals interaction described above might result from interaction diffusion of epoxy or curing agent molecules at the interface between $B_4C$ particles during ultrasonic excitation. On the other hand, when direct ultrasonic excitation was not present, a vibration mode of the curing agent molecule was not able to be changed, not only by $B_4C$ but also by the epoxy molecule on $B_4C$.

Figure 6:
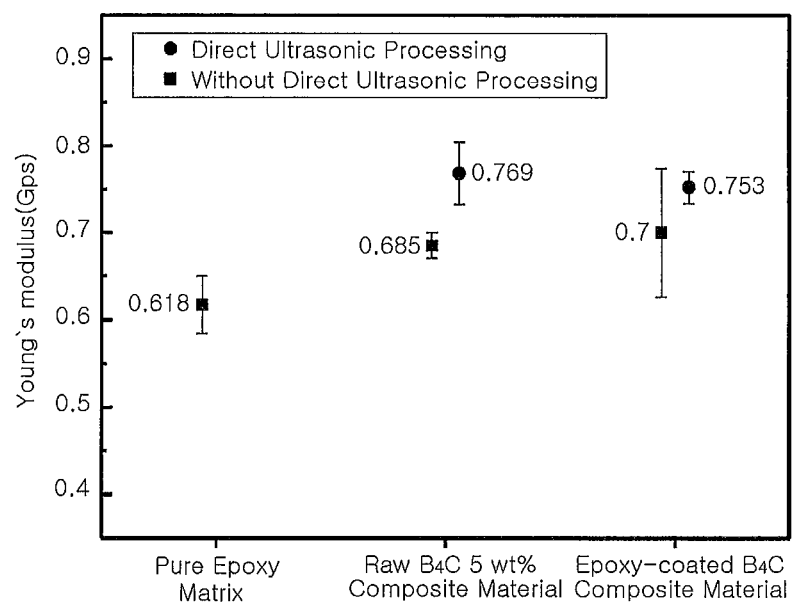
FIG. 6 is a graph illustrating Young's moduli of a pure epoxy matrix and $B_4C$/epoxy composite materials produced under various conditions.

In the case of the pure epoxy matrix and the Young's modulus for a $B_4C$/epoxy composite material, the Young's modulus for a $B_4C$/epoxy composite material was relatively increased as compared to the pure epoxy matrix, as illustrated in FIG. 6. The trend for an increase in a modulus of a polymer composite material due to the addition of the ceramic filler as described above may be a general result showing higher strength as compared to that of the pure epoxy matrix. However, according to the embodiment of the present inventive concept, the increase in modulus through the direct ultrasonic dispersion may be explained as resulting from variation rate characteristics maintained or increased by relatively high toughness provided by strong adhesion at the interface between $B_4C$ and the epoxy matrix.

Embodiment 2—Manufacturing of Aluminum Hydroxide-Containing Epoxy Composite Material and Evaluation of Physical Properties Thereof An epoxy resin composition 5 and an epoxy resin composition 6 were respectively produced using the same method as that of compositions 1 and 3 of embodiment 1, except for using the aluminum hydroxide $(Al(OH)_3)$ powder having an average particle size of 5 μm, and aluminum hydroxide/epoxy composite materials were produced using the respective compositions through the same method as that of embodiment 1. The composite materials obtained as above were composite material 5 and composite material 6, respectively.

As physical properties of the composite materials 5 and 6 obtained as above, the maximum tensile strength and an elongation prior to rupturing were measured, and the tensile strength and the elongation prior to rupturing of the composite material 5 obtained from composition 5 not subjected to the ultrasonic processing were 28.0 MPa and 7.3%, respectively, but the tensile strength and the elongation prior to rupturing of the composite material 6 obtained from composition 6 subjected to the ultrasonic processing were 40.9 MPa and 9.6%, respectively.

As can be seen from the results above, when the dispersion was performed in the curing agent through the direct ultrasonic processing, the tensile strength and the elongation values were somewhat decreased as compared with the pure epoxy resin, while the tensile strength was increased by around 45% and the elongation was also increased by around 7.3% as compared with the composite material 6 not subjected to the direct ultrasonic processing.

As described above, the direct ultrasonic process according to the embodiment of the inventive concept may allow nanoscale powder particles to be dispersed in a matrix, may also allow for micro scale, that is, comparatively large powder particles to be uniformly dispersed therein, and in addition, and further, may effectively improve mechanical properties.

Figure 7:
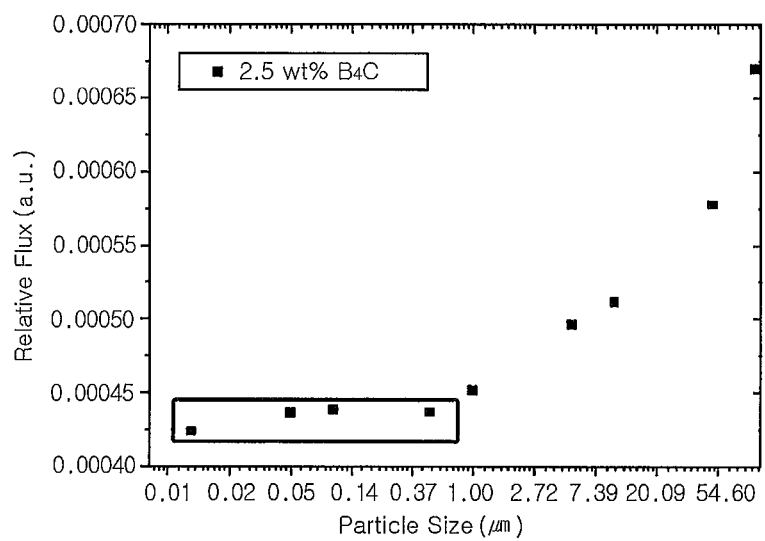
FIG. 7 is a graph illustrating results of evaluation of slow neutron shielding capability depending on a grain size of $B_4C$ powder in a $B_4C$/epoxy composite material including $B_4C$ of 2.5 wt %, using a Monte Carlo N-Particle Transport Code (MCNP) program.

Embodiment 3—Evaluation of a Slow Neutron Shielding Function of an Epoxy Composite Material, Depending on a $B_4C$ Grain Size In the case of a $B_4C$-epoxy composite material including 2.5 wt % of $B_4C$ particles, slow neutron shielding capability, depending on a grain size of $B_4C$ used, was evaluated using a monte carlo n-particle (MCNP) program, and the results thereof are illustrated in FIG. 7. On the other hand, a thickness of the epoxy composite material was assumed to be 3 cm.

As can be seen from FIG. 7, as the $B_4C$ grain size was varied from 100 μm to 1 μm, the neutron absorbing was significantly improved, but when the $B_4C$ grain size was less than 1 μm, a predetermined shielding effect was represented. Therefore, it can be appreciated that when a nanoscale boron compound powder of less than 1 μm is used, an excellent neutron shielding effect may be obtained.

Embodiment 4—Manufacturing of PbO/Epoxy Composite Material

In order to grasp an influence on tensile strength, depending on whether or not ultrasonic processing is performed in PbO powder dispersion, a PbO/epoxy resin composition including 10 wt % of PbO powder to a total weight of the epoxy resin composition was produced, and a PbO/epoxy composite material was produced using the resin composition obtained above. Here, the average particle sizes of the PbO powder particles used were 10 μm and 200 nm for comparison, respectively.

A composition 7 was produced by producing a resin composition using the same method as that of manufacturing composition 1 of embodiment 1 using the PbO powder having the average particle size of 10 μm. In addition, a composition 8 was produced by producing a resin composition using the same method as that of producing composition 1 of embodiment 1 using the PbO powder having the average particle size of 200 nm. In addition, a composition 9 was produced by producing a resin composition using the same method as that of producing composition 3 of embodiment 1 using the PbO powder having the average particle size of 200 nm.

A PbO/epoxy composite material was manufactured using compositions 7, 8 and 9 obtained as described above, and composite materials obtained as above are a composite material 7, a composite material 8, and a composite material 9.

Figure 8:
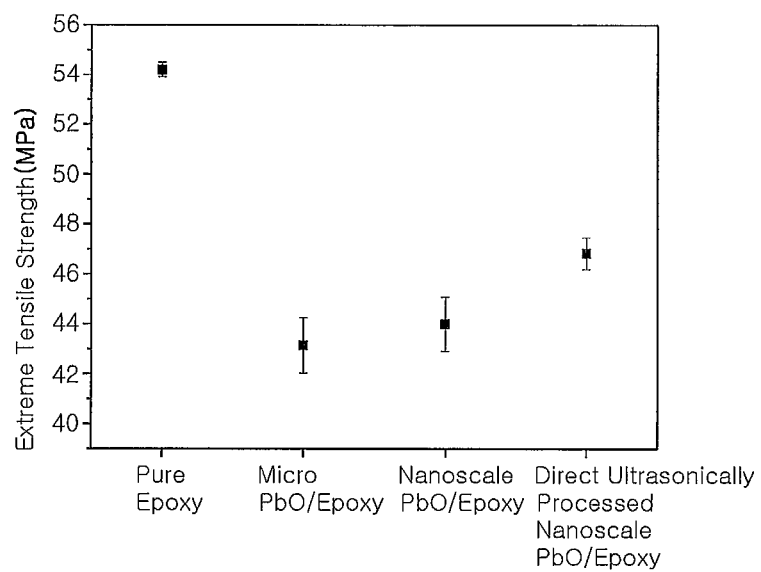
FIG. 8 is a graph illustrating a tensile strength value of a PbO/epoxy composite material depending on whether or not a PbO powder included in a composite material is subjected to direct ultrasonic processing.

Tensile strength of PbO/epoxy composite materials of the composite materials 7 to 9 was measured and the results thereof are illustrated in FIG. 8.

As can be seen from FIG. 8, shielding material (a) of a pure epoxy resin represented a tensile strength value of 54.1

MPa, while composite material (b) including micro scale PbO powder and not subjected to direct ultrasonic processing was measured as having 43.1 MPa. In addition, a shielding material of composite material (c) including nano-scale PbO powder and not subjected to the direct ultrasonic processing was measured as having 44.0 MPa. It can be appreciated that there was no significant difference in the tensile strength between shielding materials (b) and (c).

On the other hand, a shielding material of composite material (d) including nano-scale PbO powder and subjected to the direct ultrasonic processing to allow the PbO powder to be surface processed represented a tensile strength value of 46.8 MPa as a tensile strength value higher than those of (b) and (c).

As can be seen from the description above, since the PbO powder was included, although the tensile strength value thereof was lower than that of a pure epoxy, PbO powder particles were able to be uniformly dispersed in an epoxy resin and resin adhesion at an interface between particles may be improved, whereby physical properties of the composite material was improved.

Embodiment 5—Evaluation of a Slow Neutron Shielding of a Composite Material

Figure 9:
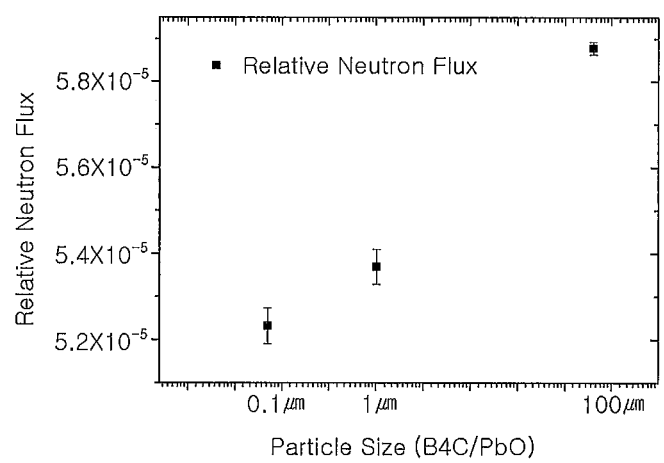
FIG. 9 illustrates relative neutron fluxes based on particle sizes.

Slow neutron shielding, depending on a powder particle size, of epoxy composite materials respectively including the contents of 5 wt %, 10 wt % and 25 wt % of $B_4C/PbO/Al(OH)_3$ with regard to a total weight of composition were evaluated using an MCNP program, and the results thereof are illustrated in FIG. 9.

It was assumed that grain sizes of $B_4C$ and PbO powder particles were 100 μm, 1 μm, and 0.1 μm, respectively in the same sizes and a grain size of $Al(OH)_3$ powder was 2 μm to be constant in all cases. On the other hand, a thickness of an epoxy composite material was assumed to be 3 cm.

The assumption that the grain size of $Al(OH)_3$ powder was 2 μm all cases is because in the case of $Al(OH)_3$, slow neutron and gamma ray shielding performance was actually relatively low as compared with other powder particles.

As can be seen from FIG. 9, in the case of respective powder particle sizes for slow neutrons, as a particle size was smaller, a flux of a slow neutron was decreased. Therefore, it can be appreciated that when a powder having a grain size of less than 1 μm was used, an excellent neutron shielding effect could be obtained.

Figure 10:
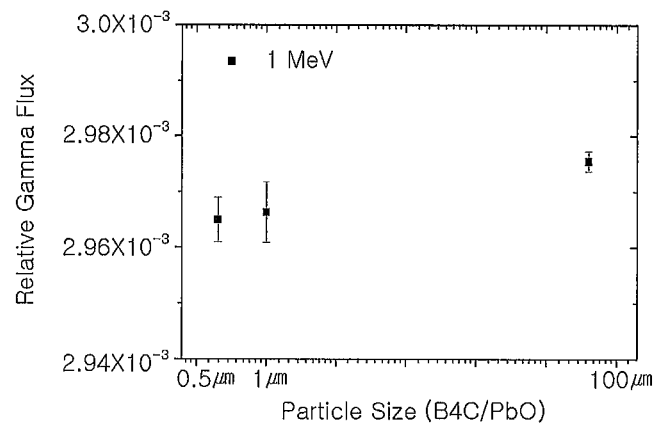
FIG. 10 illustrates relative gamma fluxes in gamma rays of 1 MeV, depending on particle sizes.
Figure 11:
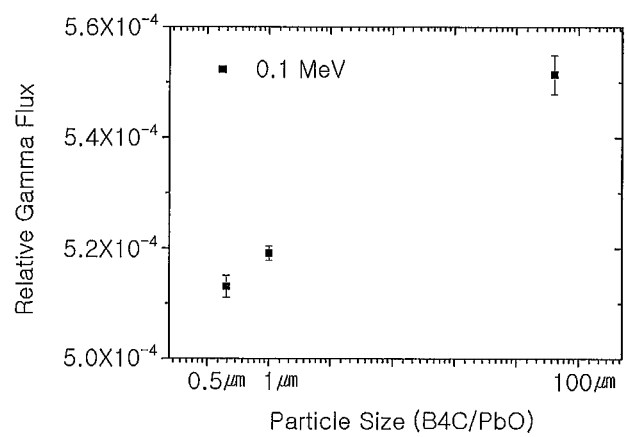
FIG. 11 illustrates relative gamma fluxes in gamma rays of 0.1 MeV, depending on particle sizes.

Embodiment 6—Evaluation of a Gamma Ray Shielding Function of a Composite Material Gamma ray shielding functions, depending on a powder particle size, of epoxy composite materials respectively including the contents of 5 wt %, 10 wt % and 25 wt % of $B_4C/PbO/Al(OH)_3$ with regard to a total weight of composition were evaluated using an MCNP program, and the results thereof are illustrated in FIGS. 10 and 11.

Here, a grain size and concentration of a powder used, and a thickness of an epoxy composite material were determined to be equal to those of embodiment 5, and gamma ray energy was evaluated in two cases of 1 MeV and 0.1 MeV.

It can be appreciated from FIGS. 10 and 11 that a case in which gamma ray energy was 0.1 MeV had increased reduction in flux of gamma rays as compared to a case in which the gamma ray energy was 1 MeV. Therefore, it can be appreciated that when a powder having a grain size of less than 1 μm was used, an excellent gamma ray attenuation effect could be obtained. In addition, it can be appreciated that in the case of a low energy gamma ray, the epoxy composite material according to the present embodiment had further excellent shielding capabilities.

While the inventive concept has been shown and described in connection with embodiments, it will be apparent to those skilled in the art that modifications and variations can be made without departing from the spirit and scope of the present inventive concept as defined by the appended claims.

The invention claimed is:

1. A method of manufacturing an epoxy resin composition for neutron shielding, comprising:
    obtaining a mixture of a curing agent and a powder by mixing an amine-based curing agent with a boron compound powder for neutron absorption and a powder containing a gamma ray attenuation, high density meta powder and a flame retardant powder;
    performing an ultrasonic wave treatment by applying ultrasonic waves to the mixture to coat a powder surface with the amine-based curing agent, simultaneously with allowing powder particles to be dispersed in the curing agent; and
    mixing the amine-based curing agent including the ultrasonic wave-treated and dispersed powder particles with an epoxy resin to then be dispersed,
    wherein the ultrasonic waves are applied by directly immersing an ultrasonic horn in the mixture including the amine-based curing agent, the boron compound powder, the high-density metal powder and the flame retardant powder mixed therein.

2. The method of claim 1, wherein the boron compound powder is at least one selected from a group consisting of $B_4C$, BN, $B2O_3$ and $B(OH)_3$, the high density metal powder is at least one selected from a group consisting of Fe, Ni, Cu, W, Pb and oxides thereof, and the flame retardant powder is at least one selected from a group consisting of aluminum hydroxide and magnesium hydroxide.

3. The method of claim 1, wherein the boron compound powder and the high density metal powder have a grain size of 200 nm or more or less than 1000 nm.

4. The method of claim 1, wherein the flame retardant agent has a grain size of 200 nm to 10 μm.

5. A method of manufacturing a neutron shielding material, comprising forming an epoxy resin composition produced using the method of claim 1 to have a predetermined form and then drying and curing the formed epoxy resin composition.

6. A method of manufacturing a neutron shielding material, comprising forming an epoxy resin composition produced using the method of claim 2 to have a predetermined form and then drying and curing the formed epoxy resin composition.

7. A method of manufacturing a neutron shielding material, comprising forming an epoxy resin composition produced using the method of claim 3 to have a predetermined form and then drying and curing the formed epoxy resin composition.

8. A method of manufacturing a neutron shielding material, comprising forming an epoxy resin composition produced using the method of claim 4 to have a predetermined form and then drying and curing the formed epoxy resin composition.

* * * * *

UNITED STATES PATENT AND TRADEMARK OFFICE
CERTIFICATE OF CORRECTION

PATENT NO. : 9,745,442 B2  
APPLICATION NO. : 14/117048  
DATED : August 29, 2017  
INVENTOR(S) : Jae-Woo Kim et al.

Page 1 of 1

It is certified that error appears in the above-identified patent and that said Letters Patent is hereby corrected as shown below:

On the Title Page

Column 1, Item (75) Inventors, Line 1, delete "Daejon" and insert -- Daejeon --

In the Claims

Column 16, Line 18, Claim 1, delete "meta" and insert -- metal --

Column 16, Line 35, Claim 2, delete "$B20_3$" and insert -- $B_2O_3$ --

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*